United States Patent
Le Guillou et al.

(10) Patent No.: US 11,985,499 B2
(45) Date of Patent: May 14, 2024

(54) METHOD FOR MANAGING AN ITEM OF SECURITY INFORMATION IN A COMMUNICATION NETWORK, DEVICE, ITEM OF EQUIPMENT FOR ACCESSING SAID NETWORK, METHOD FOR MANAGING A CONNECTION TO SAID NETWORK, CORRESPONDING DEVICE, ITEM OF TERMINAL EQUIPMENT AND COMPUTER PROGRAMS

(71) Applicant: ORANGE, Issy-les-Moulineaux (FR)

(72) Inventors: Xavier Le Guillou, Chatillon (FR); Dimitri Bricheteau, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 304 days.

(21) Appl. No.: 17/610,916

(22) PCT Filed: Apr. 6, 2020

(86) PCT No.: PCT/EP2020/059715
§ 371 (c)(1),
(2) Date: Nov. 12, 2021

(87) PCT Pub. No.: WO2020/229057
PCT Pub. Date: Nov. 19, 2020

(65) Prior Publication Data
US 2022/0217531 A1 Jul. 7, 2022

(30) Foreign Application Priority Data

May 15, 2019 (FR) ...................................... 1905046

(51) Int. Cl.
*G06F 21/00* (2013.01)
*H04W 12/041* (2021.01)
*H04W 12/08* (2021.01)

(52) U.S. Cl.
CPC ......... *H04W 12/041* (2021.01); *H04W 12/08* (2013.01)

(58) Field of Classification Search
CPC ... H04W 12/041; H04W 12/08; H04W 12/04; H04L 63/068
See application file for complete search history.

(56) References Cited

U.S. PATENT DOCUMENTS

2020/0137568 A1* 4/2020 Takeuchi ................ H04L 63/08

FOREIGN PATENT DOCUMENTS

| EP | 2276278 A1 * | 1/2011 | ........... H04L 63/068 |
| EP | 2276278 A1 | 1/2011 | |

(Continued)

OTHER PUBLICATIONS

English translation of the Written Opinion of the International Searching Authority dated Jun. 15, 2020 for corresponding International Application No. PCT/EP2020/059715, filed Apr. 6, 2020.

(Continued)

*Primary Examiner* — Kendall Dolly
(74) *Attorney, Agent, or Firm* — David D. Brush; Westman, Champlin & Koehler, P.A.

(57) ABSTRACT

A method for managing first security information to establish a secure connection between a terminal equipment and an access equipment for accessing a communication network. The first security information is associated with a validity period. The method includes: upon expiration of the validity period, obtaining second security information and triggering a deactivation time delay of the first security information; if the terminal equipment is connected to the access equipment, transmitting to the connected terminal equipment a re-authentication command message including at least the second security information and a re-authentication time delay, the time delay expiring at the latest at the (Continued)

end of the deactivation time delay of the first security information; and if a re-authentication request message is received from the terminal equipment before the expiry of the re-authentication time delay, re-authenticating the terminal equipment by using the second security information without the connection being switched off.

16 Claims, 7 Drawing Sheets

(56) References Cited

FOREIGN PATENT DOCUMENTS

| FR | 3028336 A1 | 5/2016 |
|---|---|---|
| FR | 3032582 A1 | 8/2016 |

OTHER PUBLICATIONS

International Search Report dated May 25, 2020 for corresponding International Application No. PCT/EP2020/059715, filed Apr. 6, 2020.

Written Opinion of the International Searching Authority dated May 25, 2020 for corresponding International Application No. PCT/EP2020/059715, filed Apr. 6, 2020.

* cited by examiner

METHOD FOR MANAGING AN ITEM OF SECURITY INFORMATION IN A COMMUNICATION NETWORK, DEVICE, ITEM OF EQUIPMENT FOR ACCESSING SAID NETWORK, METHOD FOR MANAGING A CONNECTION TO SAID NETWORK, CORRESPONDING DEVICE, ITEM OF TERMINAL EQUIPMENT AND COMPUTER PROGRAMS

CROSS-REFERENCE TO RELATED APPLICATIONS

This Application is a Section 371 National Stage Application of International Application No. PCT/EP2020/059715, filed Apr. 6, 2020, which is incorporated by reference in its entirety and published as WO 2020/229057 A1 on Nov. 19, 2020, not in English.

FIELD OF THE INVENTION

The field of the invention is that of communication networks, in particular wireless communication networks.

The invention concerns the management of an item of security information in such a communication network, said item of security information being used to establish a secure connection between an item of terminal equipment and an item of equipment for accessing said network.

It notably finds an application to improve the security of home Wi-Fi networks, that are currently subject to increased risks of attack.

PRIOR ART AND ITS DISADVANTAGES

Managing the security of home Wi-Fi networks is problematic. While corporate Wi-Fi networks can rely on a strong authentication, it is not the case of home networks, whose security relies on the strength of a Wi-Fi pre-shared key (PSK) between an item of equipment for accessing said network, or access point AP, and terminal equipment, or stations STA, that want to connect to it.

However, the use of such a Wi-Fi key currently has the following disadvantages:
  keys defined by an equipment manufacturer or a network operator are secure but difficult, if not impossible, for a user to remember;
  keys modified by the users often have a very low level of security;
  it is virtually impossible to revoke an access to the home network granted to a guest.

Moreover, the risk of attacks is increased today by the fact that some graphical processing units or GPUs have become powerful and fast enough for these attacks on Wi-Fi keys to be launched off-line, based on a prior capture of the Wi-Fi traffic.

From the document FR3032582, published in August 2016 by the INPI, a method for managing the duration of a secure connection is known, which proposes a technique for evaluating the strength of a password and determining a validity period of this password and thus of the connection depending on the evaluated strength. However, this document does not provide any solution for managing a change of the password or more generally of the item of security information shared by an item of terminal equipment and an item of equipment for accessing a communication network.

There is therefore a need for a technique for managing an item of security information in a communication network that does not have the drawbacks of the prior art.

Another need is a technique for managing an item of security information in a communication network that helps reduce the risk of attacks without making the access to the network more constraining for a user of an item of terminal equipment.

SUMMARY OF THE INVENTION

The invention addresses this need by providing a method for managing an item of security information, referred to as a first item of security information, intended to be used in order to establish a secure connection between at least one item of terminal equipment and one item of equipment for accessing a communication network, said first item of security information being associated with a validity period, said method comprising:
  upon expiry of the validity period, obtaining a second item of security information and triggering a deactivation time delay of the first item of security information;
  if one said item of terminal equipment is connected to the item of access equipment, transmitting to said item of terminal equipment a re-authentication command message comprising at least the second item of security information and a re-authentication time delay, said re-authentication time delay expiring before the end of said deactivation time delay of the first item security information; and
  if a re-authentication request message is received from the item of terminal equipment before the expiry of the re-authentication time delay, re-authenticating the item of terminal equipment by means of the second item of security information without the connection being switched off.

Thus, the invention is based on a completely new and inventive approach to securing a connection in a communication network, according to which an item of security information shared by an item of equipment for accessing the network and an item of terminal equipment registered to the network is renewed regularly on the initiative of the item of access equipment. It also allows any item of terminal equipment connected to the network at the time of renewal to re-authenticate without disconnecting from the network for a limited period of time where the first and second items of security information are both valid.

The item of security information is, for example, a key chosen by the item of access equipment or the terminal from a dictionary that is more restricted than the one commonly used in the prior art, and it is associated with a validity period determined based on the strength of the key. This validity period can be relatively short, for example between one day and a few weeks.

According to one aspect of the invention, the method comprises, following the triggering of the deactivation time delay and upon receipt of a message requesting the establishment of a connection of an item of terminal equipment comprising said first item of security information, verifying at least one reconnection condition, said at least one condition comprising at least the non-expiry of a reconnection time delay, said reconnection time delay expiring at the earliest at the end of the deactivation time delay of the first item of security information, and if said at least one reconnection condition is met:

establishing the connection of the item of terminal equipment based on the first item of security information; and transmitting to said item of terminal equipment a re-authentication request message comprising at least the second item of security information and a re-authentication time delay.

In this way, an item of terminal equipment that was already registered to the network before the item of security information renewal can still connect to the network for a certain period of time using the first item of security information. The item of access equipment takes advantage of the connection thus established to securely transmit to it the second item of security information. It then grants it a time delay to re-authenticate, which can be advantageously configurable, starts at the transmission of the request message and does not expire before the first item of security information is deactivated.

According to another aspect of the invention, the reconnection time delay expires at the end of the deactivation time delay of the first item of security information.

A first condition to be met is that the request for establishing a connection occurs within the deactivation time delay of the first item of security information, i.e. while it is still active.

One advantage is that the item of access equipment does not have to manage two items of security information at the same time, keys or passwords, thus two distinct connection procedures, for a too long period.

According to yet another aspect of the invention, the reconnection time delay expires at the end of a grace period triggered upon expiry of the deactivation time delay of the first item of security information.

If the first condition is not met, it is at least required that the request for establishing a connection based on the first item of security information occurs within a grace period that starts upon expiry of the deactivation time delay of this first item of security information.

One advantage of a longer time delay is that it makes the security information renewal process more flexible and allows a greater number of items of terminal equipment to update their security information easily.

According to yet another aspect of the invention, said item of terminal equipment having been previously registered to the network in association with a confidence item of information, said step for verifying at least one reconnection condition further verifies that said confidence item of information is set to a value "trustworthy".

Thus, during the grace period, only terminal equipment registered as trustworthy can reconnect to the network using the first item of security information. One advantage is to increase the level of security by excluding the guest terminal equipment that was not granted this status by the network administrator.

According to yet another aspect of the invention, the method comprises determining a list of at least one item of terminal equipment that is registered to the network with the confidence item of information set to the value "trustworthy" prior to the triggering of the deactivation time delay of the first item of security information and has not yet issued a connection request, and transmitting a notification message to the at least one item of terminal equipment before the grace period expires.

One advantage is that the item of access equipment informs the trustworthy terminal equipment that they have the opportunity to easily update their security information before declaring the first item of information permanently obsolete. Once the time delay has expired, they must reinitiate a complete procedure to register to the network.

For example, the communicating objects that usually are permanently connected to the network will receive the item of security information change notification through the Wi-Fi network. For an item of terminal equipment that is not connected to the Wi-Fi network, the item of access equipment has, for example, a mobile phone number associated with the item of terminal equipment and sends it this notification by text message.

According to yet another aspect of the invention, upon expiry of the grace period, an additional grace period is triggered as long as the list is not empty.

This ensures that no trustworthy item of terminal equipment has to re-register, which would be tedious. Of course, it can be considered that the new grace period chosen would be shorter than the previous one and that the number of renewals would be limited so as to ensure a sufficient level of security.

The invention also concerns a computer program product comprising program code instructions for implementing a method for managing an item of security information in a communication network as described previously, when it is executed by a processor.

The invention also relates to a computer-readable storage medium on which is saved a computer program comprising program code instructions for implementing the steps of the management method according to the invention as described above.

Such a storage medium can be any entity or device able to store the program. For example, the medium can comprise a storage means, such as a ROM, for example a CD-ROM or a microelectronic circuit ROM, or a magnetic recording means, for example a USB flash drive or a hard drive.

On the other hand, such a storage medium can be a transmissible medium such as an electrical or optical signal, that can be carried via an electrical or optical cable, by radio or by other means, so that the computer program contained therein can be executed remotely. The program according to the invention can be downloaded in particular on a network, for example the Internet network.

Alternatively, the storage medium can be an integrated circuit in which the program is embedded, the circuit being adapted to execute or to be used in the execution of the above-mentioned management method.

The invention also concerns a device for managing an item of security information, referred to as a first item of security information, intended to be used in order to establish a secure connection between at least one item of terminal equipment and one item of equipment for accessing a communication network, said first item of security information being associated with a first validity period.

Said device is configured to:

upon expiry of the first validity period, obtain a second item of security information and trigger a deactivation time delay of the first item of security information;

if one said item of terminal equipment is connected to the item of access equipment, transmit to said item of terminal equipment a re-authentication request message comprising at least the second item of security information and a re-authentication time delay, said re-authentication time delay expiring before the end of said deactivation time delay of the first item security information; and if a re-authentication request message is received from the item of terminal equipment before the re-authentication time delay expires, re-authenticate the item of terminal equipment by means of the second item of security information without the connection being switched off.

More generally, such a device is able to implement a method for managing an item of security information as described previously.

Advantageously, said device is integrated in an item of equipment for accessing a communication network, for example a domestic or corporate gateway.

The aforementioned corresponding item of access equipment, management device and computer program have at least the same advantages as those provided by the management method according to the present invention.

Correlatively, the invention also concerns a method for managing a connection of an item of terminal equipment to a communication network, comprising an item of equipment for accessing said network, said connection being secured by a first item of security information.

Said method is implemented by said item of terminal equipment and comprises:
- when it is connected to said network, receiving from said item of access equipment via a connection to the communication network a re-authentication command message, comprising at least a second item of security information and a re-authentication time delay less than or equal to a deactivation time delay of the first item of security information,
- transmitting, within the re-authentication time delay, a re-authentication request message to said item of access equipment comprising the second item of security information, and recording the second item of security information in place of the first item of security information.

According to the invention, the item of terminal equipment adapts its behaviour to update its connection information within the deactivation time delay set by the item of access equipment.

According to another aspect of the invention, the method comprises:
- when it is not connected to said network, receiving an item of information change notification message via an interface with another communication network, said message comprising a time delay for reconnecting to said network, said time delay expiring at the earliest at the end of the deactivation time delay of the first security information, and
- transmitting a request message for reconnecting to the communication network within said time delay.

According to yet another aspect of the invention, the method further comprises determining an instant of transmission of said re-authentication request message to said item of access equipment within the re-authentication time delay.

This embodiment advantageously applies to the case where the deactivation time delay is common to all the items of access equipment. The fact that the terminal equipment each determine their own instant of transmission of their connection request, for example randomly, smooths out the load on the item of access equipment.

The invention also concerns a computer program product comprising program code instructions for implementing a method for managing a connection to a communication network as described previously, when it is executed by a processor.

The invention also relates to a computer-readable storage medium on which is saved a computer program comprising program code instructions for implementing the steps of the management method according to the invention as described above.

Such a storage medium can be any entity or device able to store the program. For example, the medium can comprise a storage means, such as a ROM, for example a CD-ROM or a microelectronic circuit ROM, or a magnetic recording means, for example a USB flash drive or a hard drive.

On the other hand, such a storage medium can be a transmissible medium such as an electrical or optical signal, that can be carried via an electrical or optical cable, by radio or by other means, so that the computer program contained therein can be executed remotely. The program according to the invention can be downloaded in particular on a network, for example the Internet network.

Alternatively, the storage medium can be an integrated circuit in which the program is embedded, the circuit being adapted to execute or to be used in the execution of the above-mentioned management method.

The invention also concerns a device for managing a connection of an item of terminal equipment to a communication network, comprising an item of equipment for accessing said network, said connection being secured by a first item of security information.

Said device is configured to:
- receive a re-authentication command message from the item of access equipment via a connection to said network, said message comprising at least a second item of security information and a re-authentication time delay, said time delay expiring at the earliest at the end of the deactivation time delay of the first item of security information; and
- transmit within the re-authentication time delay a re-authentication request message to said item of access equipment comprising the second item of security information.

More generally, such a device is able to implement a method for managing a connection as described previously.

Advantageously, said device is integrated in an item of terminal equipment.

The aforementioned corresponding item of terminal equipment, device for managing a connection and computer program have at least the same advantages as those provided by the management method according to the present invention.

LIST OF FIGURES

Other purposes, features and advantages of the invention will become more apparent upon reading the following description, hereby given to serve as an illustrative and non-restrictive example, in relation to the figures, among which.

DETAILED DESCRIPTION OF THE EMBODIMENTS OF THE INVENTION

The general principle of the invention is based on a regular renewal of an item of security information shared by an item of equipment for accessing the network and an item of terminal equipment registered to the network, on the initiative of the item of access equipment. The invention also makes it possible for any item of terminal equipment connected to the network at the time of the item of security information change to re-authenticate without disconnecting from the network for a limited period of time where the old and new items of security information are both valid.

In the remainder of the description, the case of a home Wi-Fi communication network to which terminal equipment securely connect based on an exchange of security information, such as pre-shared keys or PSKs, is described in detail. Of course, the invention is not restricted to this example and also concerns any other type of network to which terminal equipment connect securely based on an exchange of security information. For example, the network RC is a corporate network implementing Li-Fi or another type of technology. Security information can be passwords or any other type of shared secret.

Figure 1:
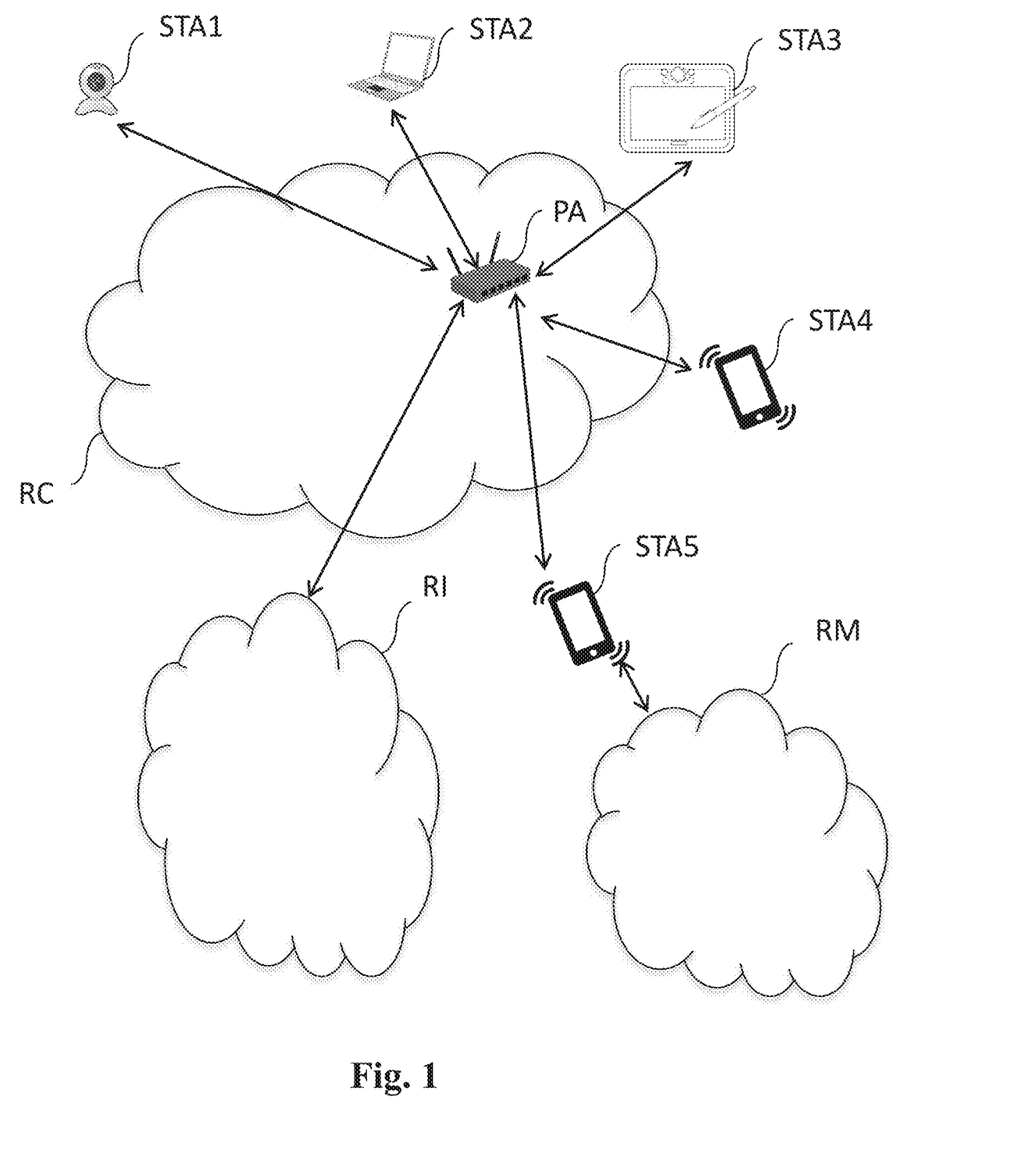
FIG. 1 This figure schematically shows an example of a local communication network managed by an item of access equipment, to which a plurality of items of terminal equipment connects, according to an embodiment of the invention.

In relation to FIG. 1, a local communication network RC comprising an item of access equipment PA, of the home gateway type, is considered. Of course, the invention is not restricted to this example and applies to any other type of item of equipment for accessing a wireless communication network, such as a Wi-Fi range extender, that can repeat a Wi-Fi signal further away, for example to reach the end of a corridor in a building.

In the example of FIG. 1, several items of terminal equipment or stations STA able to connect to the wireless communication network RC are considered:
a tablet STA1;
a mobile terminal STA2, that also has a cellular interface;
a communicating object STA1, for example a webcam;
a laptop STA3;
a mobile terminal STA4, that also has a cellular interface; and
another mobile terminal STA5, the usual equipment of an administrator user of the network RC.

In the remainder of the description, it is considered that the home gateway PA, 10 embeds a device 100 for managing an item of security information (not shown in FIG. 1) able to implement a method for managing an item of security information according to an embodiment of the invention, which will now be described in relation to FIG. 2.

In a known manner, the Wi-Fi network RC is associated with a unique identifier, called SSID (Service Set Identifier), as specified by the IEEE 802.11 standard.

In a known way, in a Wi-Fi network, the item of access equipment PA and an item of terminal equipment STA registered to the network RC share a secret, usually intelligible and in a non-digital way. According to the IEEE 802.11 standard, it is a shared security key PSK (for "Pre-Shared Key"), that is human readable and comprises between 8 and 63 characters in ASCII format. Non-digital sharing means imply that the parties do not obtain the key by exchanging messages via a non-secure digital communication. For example, the key PSK is usually chosen by the manufacturer and printed on the back of the home gateway. The user of the terminal STA must enter it via an interface on the terminal so that the latter can establish a connection with the item of access equipment PA.

It will be noted however that a terminal STA can also connect to the access point AP using a protocol called WPS ("Wi-Fi Protected Setup"), intended to simplify the security configuration phase of a wireless network and that, according to this protocol, the point of access AP transmits the key PSK to the terminal STA in a non-secure manner.

Based on this key PSK, the item of access equipment and the item of terminal equipment STA each generate another key called PMK (Pairwise Master Key) using an algorithm specified by the IEEE 802.11 standard. Based on this key PMK, the equipment PA and STA exchange messages and derive other keys forming a set of security keys to establish a secure connection between them. In this way, the key PSK is never exchanged on the network.

In the remainder of the description, a key set originating from the key PSK will be referred to as JK and JK will be used invariably to designate a key of this set exchanged in a message between the item of access equipment PA and a terminal STA.

In the remainder of the description, the case where the key PSK1 is not the one printed by the manufacturer on the back of the home gateway PA housing, but has been chosen by a user or automatically by the gateway PA and has been associated with a validity period DV1, is more particularly considered. For example, this validity period has been determined according to a strength of the key PSK1, using for example the solution of the prior art previously mentioned. This strength is evaluated according to an entropy of the key, which allows to estimate an "average life before breaking" of this key, that is then divided by a factor comprised between 50 and 100 for additional security. It can be comprised between one day and a few months.

Upon expiry of the validity period DV1 associated with this first key PSK1 and detected in P20, a second key PSK2 is obtained in P21 and a deactivation time delay DD of the first key PSK2 and thus of the first key set JK1 is triggered in P22.

For example, the deactivation time delay is:
set manually, for example, equal to 24 hours; or
preferably, determined according to the validity period DV1 of the first key, and less than the validity period. For example, for a validity period DV1 of one week, a deactivation time delay of 24 hours would seem appropriate.

In a similar manner, the second key PSK2 can be obtained in various ways:
the administrator user of the network chooses it themselves and an associated validity period DV2 is calculated using, for example, the solution of the prior art previously mentioned;
the item of access equipment PA creates it from a dictionary, for example according to the technique described in the French patent application published under number FR3028336, by the INPI in May 2016.

In P23, a list of terminal equipment STA registered to the communication network RC is determined.

At the time of the key change, this terminal equipment may or may not be connected to the network RC.

In what follows, two cases are thus considered:
According to a first case, an item of terminal equipment is connected to the network RC via the item of access equipment PA, that transmits to it in P24 a re-authentication command message comprising at least the second key JK2 and a re-authentication time delay DR. This time delay can be configurable and chosen according to the item of terminal equipment STA, but it expires at the latest at the end of the deactivation time delay DD of the first key. In P25, the item of access equipment PA receives the re-authentication request message from the item of terminal equipment.

In P26, it verifies that the re-authentication time delay DR has not expired:
if the re-authentication time delay DR has not expired, it re-authenticates the item of terminal equipment in P27 by means of the second key JK2 without switching off or terminating the connection;
otherwise, it terminates the connection in P28.

According to a second case, an item of terminal equipment, not connected to the item of access equipment PA at the time of the key change, requests to connect. The item of access equipment PA receives in P29 a message RCNX requesting the establishment of a connection comprising said first key JK1 from this terminal. In P30, it verifies at least one reconnection condition CND, comprising at least the non-expiry of a predetermined reconnection time delay DX. This time delay DX usually does not expire before the deactivation time delay DD of the first key.

If said at least one reconnection condition is met:
the item of equipment PA establishes in P31 the connection of the item of terminal equipment to the communication network based on the first key;
it triggers a procedure for re-authenticating the item of terminal equipment by repeating the steps P24 to P28 already described in the first case. Firstly, it transmits in P24 a re-authentication request message comprising at least the second key and a re-authentication time delay DR. Here, this time delay does not necessarily correspond to the deactivation time delay of the first key PSK1 that may have already expired. However, it is chosen with a reasonable duration, generally less than the time delay DD;
upon receipt in P25 of a re-authentication request from the item of terminal equipment, it verifies in P26 the non-expiry of the time delay DR, where applicable re-authenticates in P27 the item of terminal equipment by means of the second key without the connection being switched off;
otherwise, upon expiry of the time delay DR, it terminates the connection in P28; otherwise, if at least one reconnection condition CND is not met, it rejects the connection request in P32.

Figure 5:
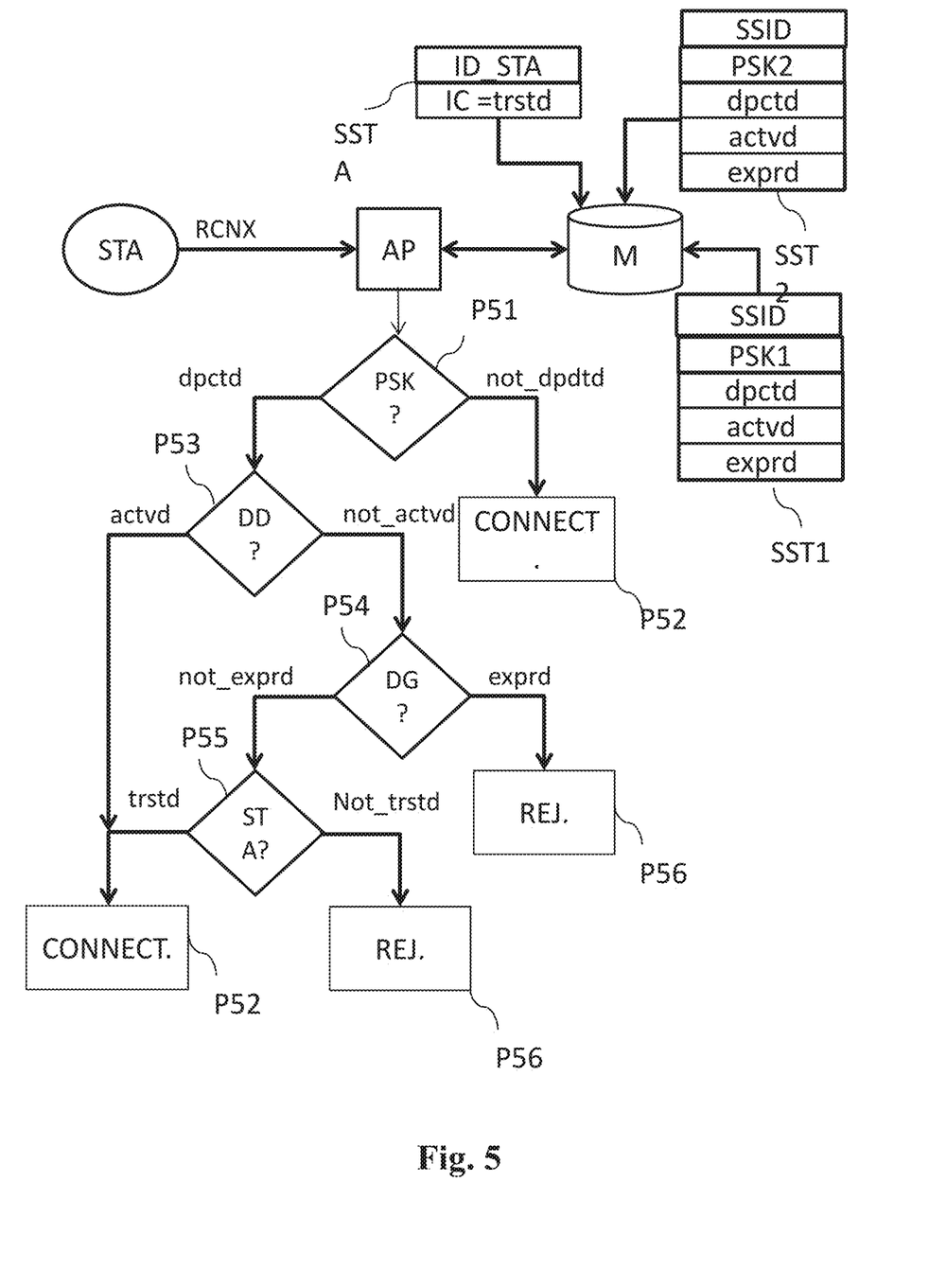
FIG. 5 This figure schematically shows the verification of conditions for reconnecting an item of terminal equipment to the communication network following the item of security information renewal according to an embodiment of the invention.

Examples of reconnection conditions will be detailed below in relation to FIG. 5.

Optionally, in P33, the item of access equipment PA notifies the terminal equipment STA in the list LST that are not connected to the network RC of the key change event and of the need to reconnect within a predetermined reconnection time delay DX. To do this, the item of equipment PA transmits them a key change notification message NCK via another communication network which it accesses via the Internet network RI. For example, it sends a text message to a mobile terminal able to connect to a mobile network RM. It will be noted that, alternatively, the item of equipment PA, when equipped with a screen, can also control the display of a notification on this screen or on another screen in the house, connected to the network RC. In this way, the users of terminal equipment in the house can become aware of the new key PSK2 or at least of the need to reconnect quickly.

In P34, the item of access equipment updates the list LST by removing the identifier of the item of terminal equipment STA that reconnected. Optionally, in P35, it verifies shortly before the time delay DX expires if the list LST is still available, and if not, it can extend the time delay DX by adding an additional grace period to give the terminal equipment that have not yet done so an additional opportunity to reconnect. Advantageously, it verifies the status of the terminal equipment in the list LST and extends the time delay DX only for those that are trustworthy.

Figure 3:
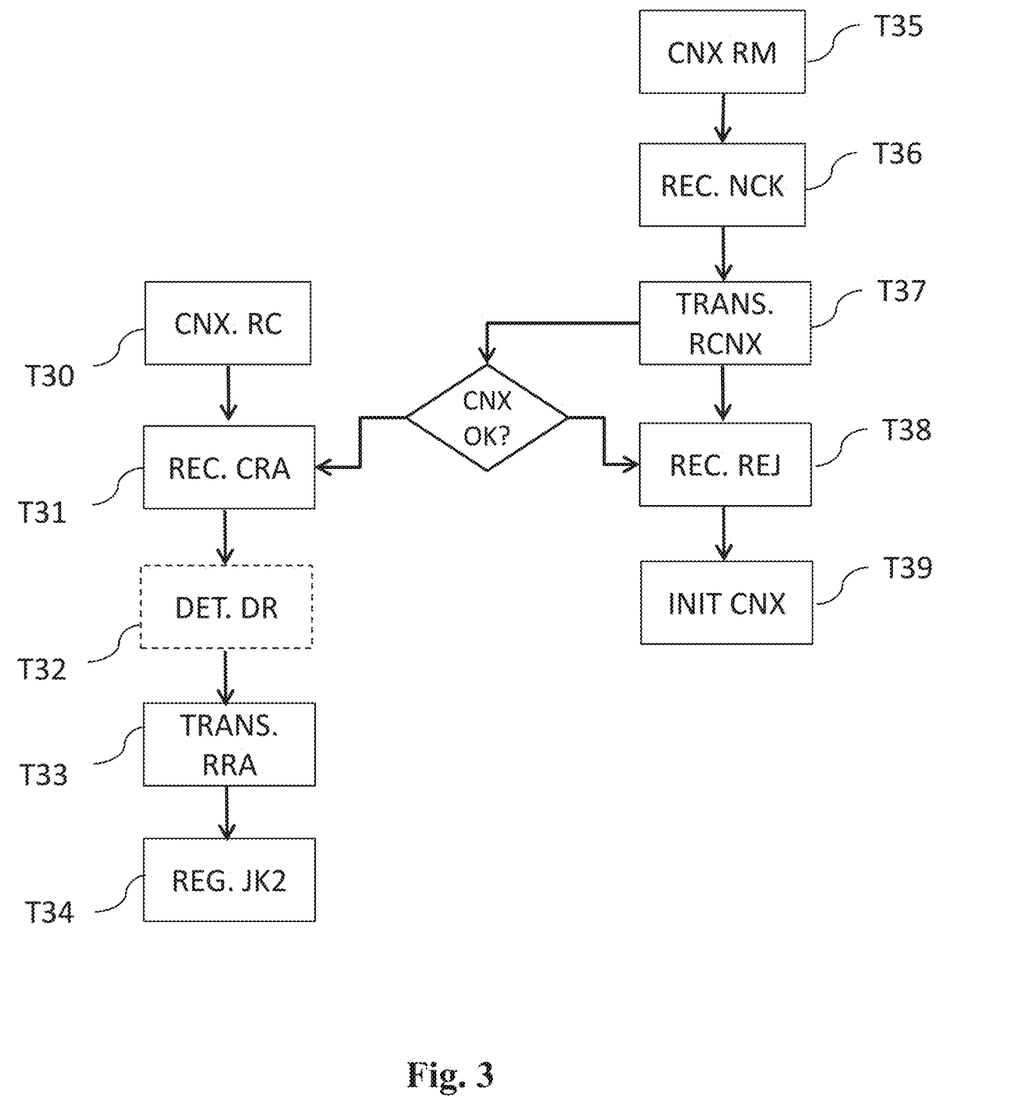
FIG. 3 This figure shows in the form of a flowchart the various steps of the method for managing a secure connection to a communication network, implemented by an item of terminal equipment, according to an embodiment of the invention.

A method for managing a connection of an item of terminal equipment STA to the communication network RC according to an embodiment of the invention is now described in relation to FIG. 3. This method is intended to be implemented by a device connected to or embedded in the item of terminal equipment STA.

According to a first case, it is assumed that the item of terminal equipment STA has previously established a connection with the network RC in T30 and that this connection is in progress when the key is changed at an instant t0.

In T31, it receives via this connection a re-authentication command message CRA from the item of access equipment PA. This message comprises the second key PSK2 and a re-authentication time delay DR.

Optionally, the item of equipment STA implements in T32 a random determination of a re-authentication instant $t_{RA}$ comprised in the time delay DR. It sends in T33 a re-authentication request to the item of equipment PA at the determined instant $t_{RA}$, where appropriate, otherwise upon expiry of the time delay DR.

In T34, once re-authenticated, the terminal STA stores the new key set JK2 originating from the second key PSK2.

According to a second case, the item of terminal equipment STA is not connected to the network RC, for example because it is out of range of this network or because it has disabled its Wi-Fi transmission/reception module. However, it is assumed that it has connected in T35 to another communication network, for example the mobile network RM, which the item of access equipment PA can also access via the internet network RI. It receives in T36 a key change notification message NCK from the item of access equipment PA comprising a reconnection time delay DX. In T37, when it is back in range of the network RC, it sends a connection request RCNX to the item of equipment PA.

At this stage, two cases are considered:
either the time delay DX has expired and the item of access equipment PA rejects the connection request RCNX. The terminal STA receives a rejection message in T38;
or the time delay DX is running and the item of access equipment establishes the connection in P31. The terminal STA then receives, via this connection, a re-authentication command message, that corresponds to step T31 already described. This is followed by steps T32 to T34 already described.

Figure 4A:
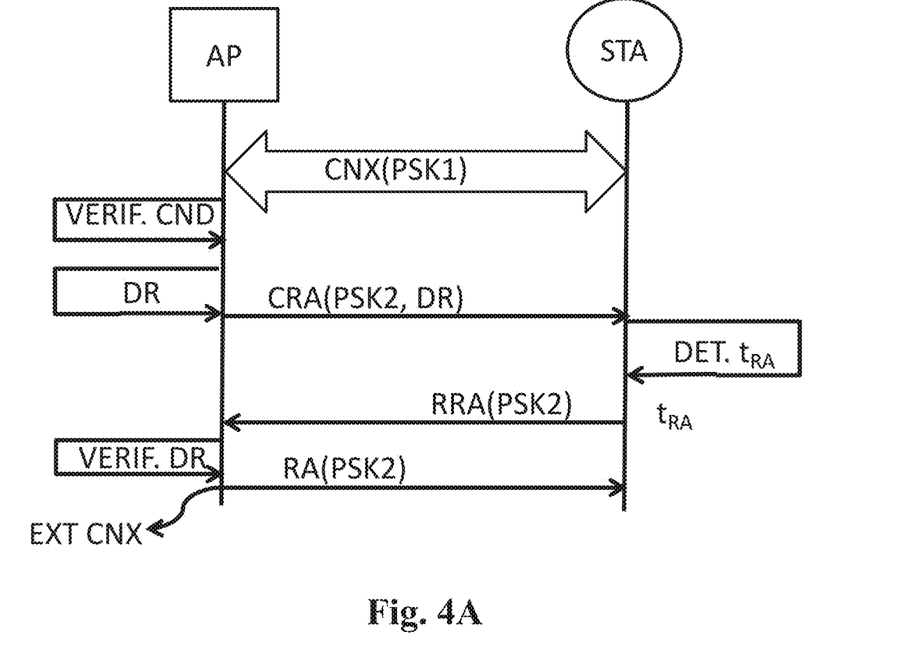
FIG. 4A This figure schematically shows the messages exchanged between an item of equipment for accessing the network and an item of terminal equipment following the item of security information renewal according to a first embodiment of the invention.
Figure 4B:
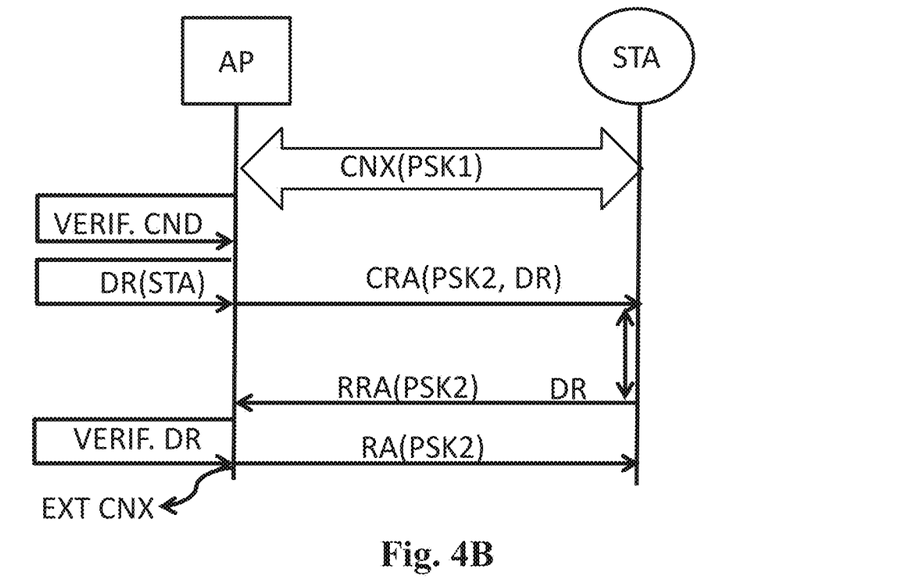
FIG. 4B This figure schematically shows the messages exchanged between an item of equipment for accessing the network and an item of terminal equipment following the item of security information renewal according to a second embodiment of the invention.

The re-authentication of an item of terminal equipment already registered to the communication network RC, corresponding to steps P24-P28 and T31-34, is now detailed in relation to FIGS. 4A and 4B. Any of the two cases previously described is considered, where the item of terminal equipment STA is connected to the network RC at the time of the key change or requests connection shortly after this change, in the reconnection conditions CND. In both cases, the connection was established on the basis of the first key PSK1 and therefore of the key set JK1 derived from PSK1.

The item of access equipment PA transmits in P23 a re-authentication command message CRA comprising the second key PSK2 and a re-authentication time delay DR.

According to a first embodiment illustrated in FIG. 4A, this time delay corresponds to a time period during which the item of terminal equipment STA can choose the instant $t_{RA}$ when it requests to re-authenticate.

Advantageously, the item of terminal equipment STA randomly determines this instant in T32 within the indicated time delay DR. The item of access equipment PA thus can transmit a re-authentication command CRA to several items of terminal equipment STA simultaneously comprising the same time delay DR, with the assurance that the re-authentication requests it will have to process in return will reach it at distinct times spread over the DR period.

According to a second embodiment illustrated in FIG. 4B, the time delay DR indicated by the item of access equipment to the item terminal equipment STA is an imperative time delay that it has specifically chosen for this terminal STA, also in order to avoid having to manage a peak of re-authentication requests.

According to an embodiment of the invention, the second case, an item of terminal equipment STA, registered to the network RC, but not connected at the time of the key change, is now considered. It therefore has login information comprising the first key PSK1 being deactivated. The step P29 for verifying the reconnection conditions CND of the item of terminal equipment STA by the item of access equipment PA is detailed in relation to FIG. 5.

It is assumed that the item of access equipment PA receives a connection request from an item of equipment STA based on the first key PSK1.

It is assumed that, according to the invention, the item of equipment PA stores a new data structure SST1 comprising status information of the first item of security information, for example the first key set JK1 originating from the key PSK1, intended to be used to connect terminal equipment to the network RC identified by its SSID. For example, this data structure comprises three distinct information fields relating to three different states or statuses that the security key can take:
a field relating to an obsolescence parameter of the key. The item of access equipment PA sets this information field or parameter to the value "dprtd", for example equal to 1, for the first key as soon as it obtains a second key PSK2 and triggers the key change;
a field relating to an activity parameter of the key. The item of equipment PA sets it to "not_actvd", for example equal to 0, upon expiry of the deactivation time delay DD;
a field relating to a grace period DG. The item of equipment PA sets it to 1 once the deactivation time delay has expired.

It is understood that the item of equipment PA for accessing the network RC manages one data structure SST per key, thus at least one data structure SST1 for the first key and one data structure SST2 for the second key.

The data structure SST2 is initialised as follows:
the field relating to an obsolescence parameter of the key is set to the value "non_dprtd", for example equal to 0;
the field relating to an activity of the key is set to "actvd", for example equal to 1;
a field relating to a grace period. The item of equipment PA sets it to a value "unused", for example equal to 2, as long as it is not relevant. It will be used, according to the invention, when a renewal of the second key set JK2 originating from PSK2 is decided.

It will be noted that the IEEE 802.11 standard does not provide in its current specification for the possibility to associate several items of security information, for example of the PSK type, with the same network identifier SSID. On the contrary, the invention proposes to introduce for a limited period of time a second key set JK2 originating from a second key PSK2, as well as attributes to describe the current status of each of these key sets. These attributes are stored, for example, in the data structures SST1, SST2 that have just been described.

The attribute fields of these data structures therefore provide information on the status of the two key sets JK1 and JK2. These data structures are particularly useful during the period when the two key sets coexist. For example, when the first key set has definitively expired, for example after the grace period DG (or the last additional grace period DGS), the structure SST1 is erased from the memory of the item of access equipment PA. A new structure SST3 will be created when the second key set is renewed at the end of its validity period DV2. Alternatively, only the attribute values can be deleted and the same structure SST1 is used for the key set JK3.

Upon receiving the connection request based on the first key PSK1 from the item of terminal equipment STA, the item of access equipment PA verifies in P51 the status of this first key PSK1 by checking the data structure SST1 stored in memory. In particular, it tests the value of the obsolescence parameter. If it is set to the value "not_dpctd", for example equal to 0, which means that the first key is not obsolete, then it triggers step P52 that corresponds to establishing the connection of the item of terminal equipment STA, followed by a re-authentication without the connection being switched off, as described previously in relation to FIGS. 2, 4A and 4B. If, on the contrary, it is set to the value "dpctd", for example equal to 1, it triggers step P53.

Step P53 tests the second parameter of the data structure SST1, relating to the expiry of a deactivation time delay of the first key. As a reminder, this time delay is triggered by the item of access equipment PA at the time of the key change. If this parameter is set to the value "not_actvd", for example equal to 0, which means that the first key is deactivated because the time delay DD has expired, then the item of access equipment triggers step P54. If, on the contrary, it is set to the value "actvd", for example equal to 1, then the item of access equipment PA triggers step P52 for establishing the connection of the item of terminal equipment STA.

Step P54 tests the third parameter of the structure SST1 relating to expiry of a grace period DG triggered upon expiry of the deactivation time delay DD. This grace period therefore extends the time delay DX, i.e. the period during which an item of terminal equipment can reconnect using the first key. If this parameter is set to the value "exprd", for example equal to 1, which means that the grace period DG has expired, then the item of access equipment triggers step P56 for rejecting the connection request. This means that in order to reconnect, the item of terminal equipment will have to perform an initial connection procedure to the network, as if it was not already registered. If, on the contrary, it is set to the value "not_exprd", for example equal to 0, then the item of access equipment PA triggers a subsequent step that can be step P52 for establishing the connection with the terminal STA.

Optionally, the item of equipment PA first triggers a step P55 for testing a status of the item of terminal equipment STA. Advantageously, this status is stored in memory by the item of access equipment PA in a data structure SSTA comprising a record associating with a unique identifier ID_STA of the item of terminal equipment STA a parameter IC representative of a level of confidence assigned to the terminal STA. For example, this unique identifier can be the MAC address of the item of terminal equipment.

It will be noted that a more secure identifier can also be obtained by exchanging between the item of access equipment and the terminal an item of data "authenticating" the terminal, and thus virtually "signed" by the terminal, which can be:
  either an item of data randomly generated at the first connection and stored by the two items of equipment;
  or an item of data actually signed by means of asymmetric cryptography.

This confidence parameter IC can take a first value "trstd", equal to 1, which means that the item of terminal equipment STA is trustworthy, or a second value "not_trstd", equal to 0, which means on the contrary that the terminal STA is not trustworthy. These values can be assigned to the item of terminal equipment STA when it is first connected by a user assuming a role of administrator of the communication network RC. For example, the administrator will assign the value "trstd" to the house terminal equipment, such as the connected objects that are usually present in the house rooms, and to the user terminals of the house residents, and will assign the value "not_trstd" to a guest item of terminal equipment.

In P55, if the parameter representative of a confidence level of the item of terminal equipment STA is set to "trstd", the item of equipment PA triggers step P52 for establishing a connection to the network. Otherwise, it rejects the connection request in P56.

Thus, according to the invention, the item of access equipment PA filters the connection requests during a transition period during which the two security key sets JK1 and JK2 coexist. The item of access equipment controls the duration of this transition period, that must be kept as short as possible so as not to make the management of the network too complex. As mentioned earlier, it is at least equal to the deactivation time delay DD of the first key PSK1. It can be extended by the duration of a grace period in order to facilitate the reconnection of terminal equipment that are already registered to the network but were not connected when the key change was triggered.

According to an embodiment, at the end of this grace period DG, the item of access equipment verifies that all trustworthy items of terminal equipment STA have reconnected and then re-authenticated.

It can decide to extend the grace period by an additional grace period DGS, that can be chosen to be less than or equal to DG, to give "trustworthy" terminals one last opportunity to easily reconnect to the network RC.

It will be noted that according to the invention and in the case of a Wi-Fi network, the frame management messages exchanged between the item of access equipment PA and an item of terminal equipment STA are as specified by the IEEE 802.11 standard, section 9.3.3.12, but that the invention proposes to specify an additional one, the re-authentication command message CRA, to invite the item of terminal equipment STA to re-authenticate, on the initiative of the item of access equipment PA.

For example, according to the invention, this re-authentication command message CRA comprises the following information fields:
  an item of information representative of re-authentication reason (reason code), set to a value indicative of an update of the item of security information, for example of the key PSK (update-PSK);
  the new item of security information, for example the new key PSK (data); and
  a re-authentication time delay DR, after which a re-authentication request will be rejected (max_delay).

Figure 6:
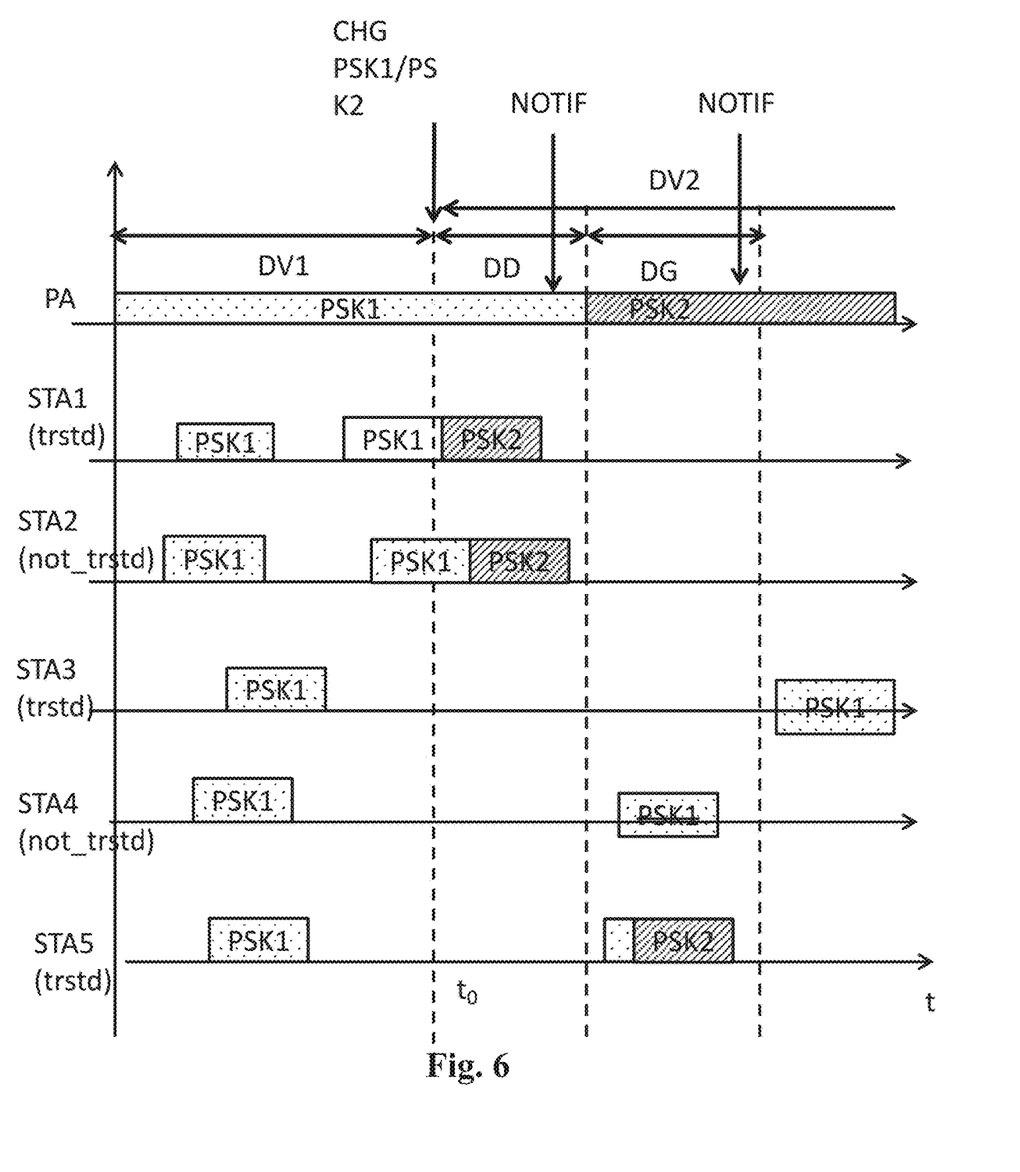
FIG. 6 This figure schematically shows an example of a timing diagram of the exchanges between terminal equipment registered to the communication network and the item of equipment for accessing said network following the item of security information renewal according to an embodiment of the invention.

A timing diagram of the exchanges between the terminal equipment STA1-STA4 and the item of access equipment PA of FIG. 1 before, during and after a change of security keys according to an embodiment of the invention is now described in relation to FIG. 6.

It is assumed that the validity period DV1 associated with the key PSK1 expires at t0. The item of access equipment PA obtains a new key PSK2 and initiates a key change and a deactivation time delay DD of the first key PSK1.

The communicating object STA1 that is connected to the network RC at the time of the key change at t0 is considered. The item of access equipment PA sends it a re-authentication command CRA comprising the new key JK2 derived from PSK2 and a re-authentication time delay DR. It is assumed that STA1 requests to re-authenticate within the given delay time DR. Thus, it obtains the new key set JK2 without losing the connection.

The laptop STA2, that is registered to the network RC, but not connected at the time of the key change, is now considered. It is assumed that it does not request to reconnect within the deactivation time delay DD, but that according to this embodiment of the invention, the item of equipment PA extends the time delay DD by a grace period DG during which the item of equipment STA2 requests to connect based on the now deactivated first key JK1. In this example, the item of equipment PA maintains a data structure SSTA that, as described previously, associates to an item of terminal equipment registered to the network an item of information relating to a level of confidence it was granted. It is assumed that STA2 is considered "trustworthy" (CI="trstd", for example equal to 1). The item of equipment PA therefore does not reject its connection request, but asks it to reconnect according to step 42 that corresponds to establishing the connection of the item of terminal equipment STA, followed by a re-authentication without the connection being switched off, as described previously in relation to FIGS. 2, 3A-B.

As for the item of terminal equipment STA3, it was not connected at the time of the key change and requests to reconnect based on the old key set JK1 after the grace period DG has expired. Although it has the "trustworthy" status, the item of access equipment rejects its connection request, which means that it must re-register to the network, as a new item of equipment.

The mobile terminal STA4 was not connected when the keys were changed. It requests to reconnect during the grace period DG, but since it is not associated with the "trustworthy" status, its request is rejected by the item of access equipment AP.

Finally, as for the item of terminal equipment STA5, it is "trustworthy", but it is also the mobile terminal of the administrator user of the network RC. Advantageously, the item of access equipment PA notifies the administrator of the change of keys, for example by transmitting it a text message notification via a mobile network RM or via an application for managing the network RC installed on the terminal STA5. For example, a first notification message is transmitted shortly after t0 and if upon expiry of the deactivation time delay DD of the first key PSK1 the terminal STA5 still has not reconnected, the item of access equipment PA can send it a second message before the grace period DG expires. In addition, as previously mentioned, the item of equipment PA can also decide to extend the grace period by an additional time delay DGS if some trustworthy items of terminal equipment still have not reconnected to the network RC.

Figure 7:
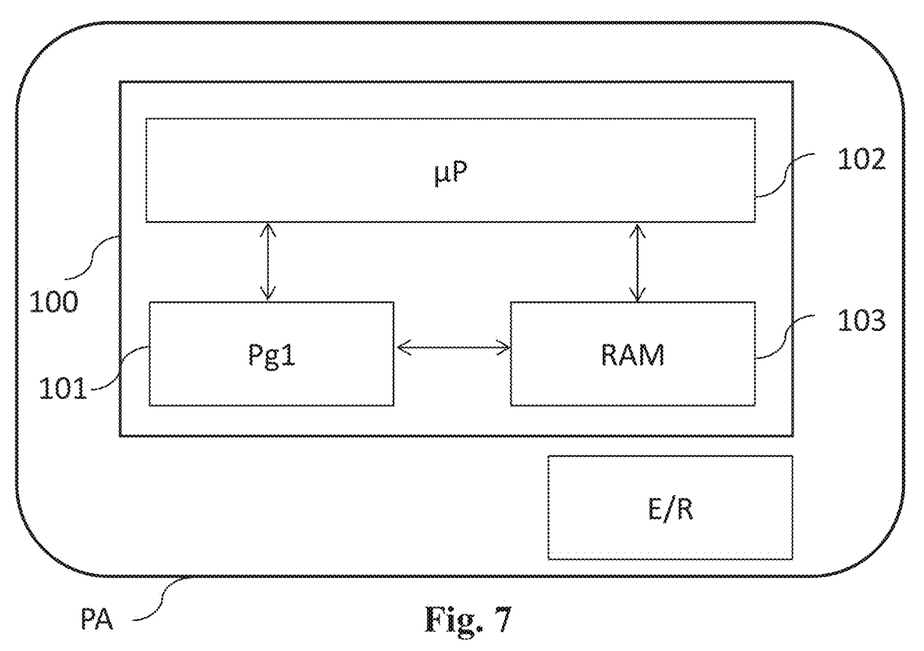
FIG. 7 This figure provides a block diagram of an item of equipment for accessing a communication network comprising a device for managing an item of security information in a communication network implementing the method for managing an item of security information of FIG. 2.

The hardware structure of a device 100 for managing an item of security information, referred to as a first item of security information, intended to be used in order to establish a secure connection between at least one item of terminal equipment and one item of equipment PA for accessing a communication network, said first item of security information being associated with a first validity period DV, is now shown in relation to FIG. 7.

The device 100 further comprises a module for obtaining a second item of security information, able to be implemented upon expiry of the validity period DV, and a module for triggering a deactivation time delay of the first item of security information, a module for transmitting to an item of terminal equipment connected to the item of access equipment a re-authentication request message comprising at least the second item of security information and said deactivation time delay of the first item of security information and a module for switching off the connection upon expiry of the deactivation time delay. Advantageously, it also comprises a module for verifying at least one reconnection condition, a module for determining a list of at least one item of terminal equipment that is registered to the network with the "trustworthy" status prior to the triggering of the deactivation time delay of the first item of security information and that has not yet issued a connection request, and a module for transmitting a notification message to said at least one item of terminal equipment before a grace period expires, in accordance with the embodiments described in relation to FIGS. 2, 4A, 4B, 5 and 6.

The term "module" can correspond to a software component as well as to a hardware component or a set of hardware and software components, a software component itself corresponding to one or more computer programs or subprograms, or more generally, to any element of a program capable of implementing a function or set of functions.

More generally, such a management device 100 comprises a random access memory 103 (a RAM memory, for example), a processing unit 102 equipped for example with a processor and controlled by a computer program Pg1, representative of the module for obtaining a second item of security information, of the module for triggering a deactivation time delay of the first item of security information, of the module for transmitting a re-authentication message and of the module for switching off the connexion, stored in a read-only memory 101 (a ROM memory or hard disk, for example). At initialisation, the code instructions of the computer program are for example loaded into a random access memory 103 before being executed by the processor of the processing unit 102. The random access memory 103 notably contains the values of the first and second items of security information, the associated validity periods, and the deactivation time delay of the first item of security information. Advantageously, it comprises the data structures SST1 and SST2 providing information on the status of each item of security information, the data structures SSTA associating an identifier of an item of terminal equipment STA with a parameter representative of a confidence level IC and a list LST of trustworthy terminal equipment STA which have not yet reconnected to the network RC following the renewal of the first item of security information.

Figure 2:
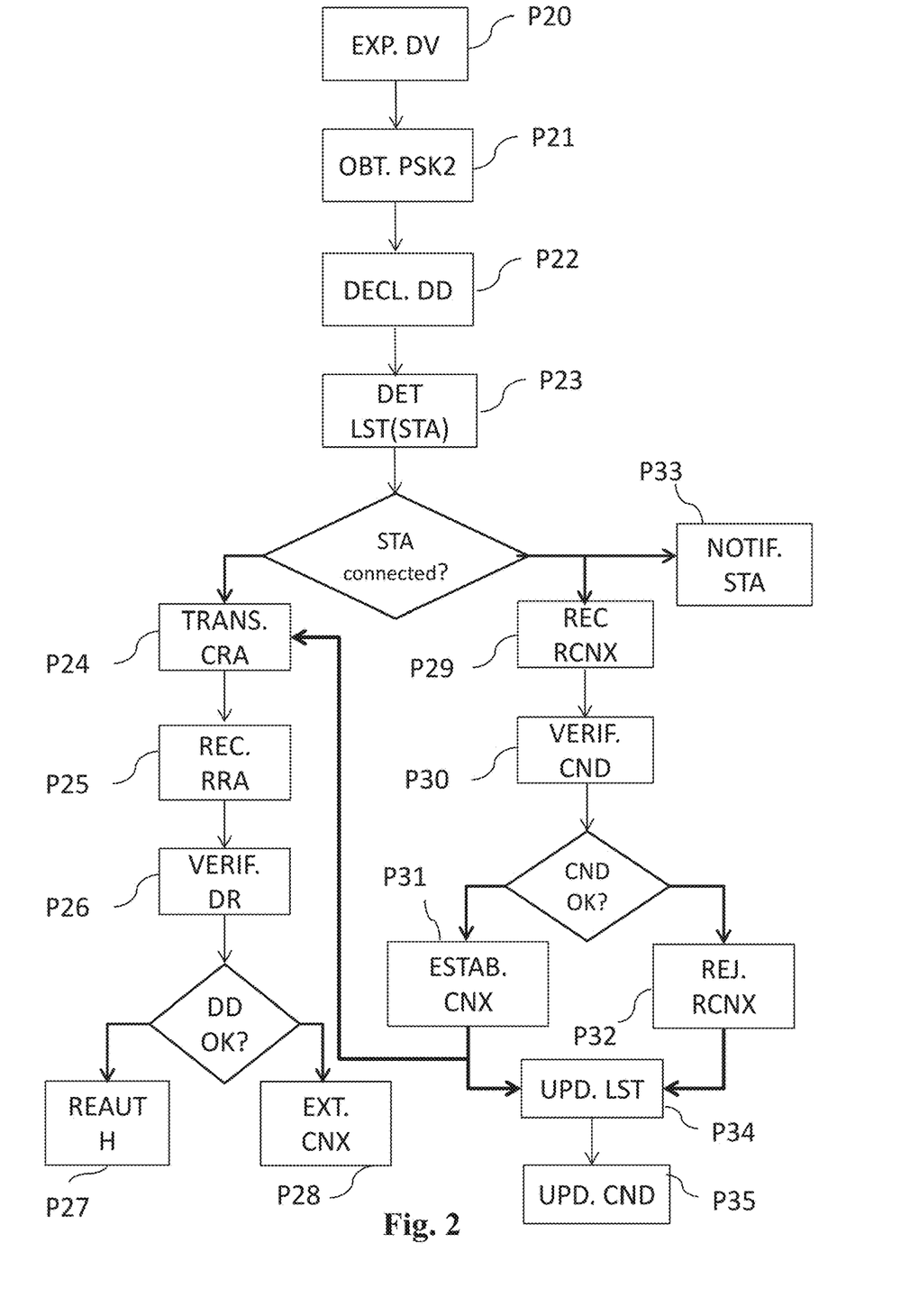
FIG. 2 This figure shows in the form of a flowchart the various steps of the method for managing an item of security information in a communication network, implemented by an item of access equipment, according to an embodiment of the invention.

The processor of the processing unit 102 controls the obtaining of the second item of security information, the triggering of the deactivation time delay of the first item of security information, the transmission of a re-authentication command message and the switching off of the connection, according to the flowchart of FIG. 2.

FIG. 7 only shows a particular one of several possible ways of realising the management device 100, so that it executes the steps of the method for managing an item of security information as detailed above, in relation to FIG. 2 in its various embodiments. Indeed, these steps may be implemented indifferently on a reprogrammable computing machine (a PC computer, a DSP processor or a microcontroller) executing a program comprising a sequence of instructions, or on a dedicated computing machine (for example a set of logic gates such as an FPGA or an ASIC, or any other hardware module).

In the case where the device 100 is realised with a reprogrammable computing machine, the corresponding program (i.e. the sequence of instructions) can be stored in a removable (such as, for example, a floppy disk, CD-ROM or DVD-ROM) or non-removable storage medium, this storage medium being partially or totally readable by a computer or a processor.

The various embodiments have been described above in relation to a management device 100 embedded in a home gateway, but it can also be embedded in any item of equipment PA for accessing a local communication network.

Figure 8:
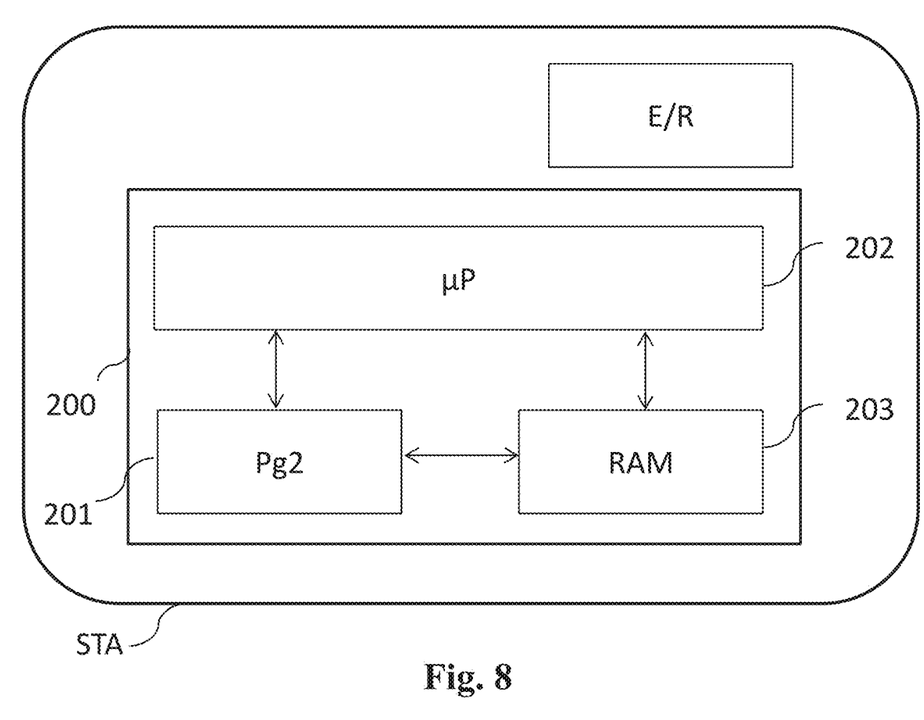
FIG. 8 This figure provides a block diagram of an item of terminal equipment comprising a device for managing a connection to a communication network, implementing the method for managing a connection to a communication network of FIG. 3.

Finally, the hardware structure of a device 200 for managing a connection of an item of terminal equipment to a communication network, comprising an item of equipment for accessing said network, said connection being secured by a first item of security information, is described in relation to FIG. 8.

The device 200 comprises a module for receiving from said item of access equipment via a connection to the communication network a re-authentication command message, comprising at least a second item of security information and a re-authentication time delay, able to be implemented when the item of terminal equipment is connected to said network, a module for transmitting, within the re-authentication time delay, a re-authentication request message to said item of access equipment comprising the second item of security information, and a module for recording in a memory the second item of security information in place of the first item of security information.

Advantageously, it also comprises a module for receiving an item of security information change notification message via an interface with another communication network, said message comprising a time delay for reconnecting to said network, a module for transmitting a request message for reconnecting to the communication network (RC) within said time delay and a module for randomly determining an instant of transmission of said re-authentication request message to said item of access equipment within the re-authentication time delay in accordance to the various embodiments described in relation to FIGS. 3, 4A, 4B and 6.

The term "module" can correspond to a software component as well as to a hardware component or a set of hardware and software components, a software component itself corresponding to one or more computer programs or subprograms, or more generally, to any element of a program capable of implementing a function or set of functions.

More generally, such a device 200 comprises a random access memory 203 (a RAM memory, for example), a processing unit 202 equipped for example with a processor and controlled by a computer program Pg2, representative of the reception module, the transmission module and the recording module, stored in a read-only memory 201 (a ROM memory or hard disk, for example). At initialisation, the code instructions of the computer program are for example loaded into a random access memory 203 before being executed by the processor of the processing unit 202. The random access memory 203 notably contains the first and second items of security information and the re-authentication time delay. The processor of the processing unit 202 controls the reception of the re-authentication command message, the transmission of a re-authentication request message and the storage in a memory of the second item of security information in place of the first item of security information, in accordance to the flowchart in FIG. 3.

FIG. 8 only shows a particular one of several possible ways of realising the management device 200, so that it executes the steps of the method for managing a connection as detailed above, in relation to FIG. 3. Indeed, these steps may be implemented indifferently on a reprogrammable computing machine (a PC computer, a DSP processor or a microcontroller) executing a program comprising a sequence of instructions, or on a dedicated computing machine (for example a set of logic gates such as an FPGA or an ASIC, or any other hardware module).

In the case where the item of access equipment is realised with a reprogrammable computing machine, the corresponding program (i.e. the sequence of instructions) can be stored in a removable (such as, for example, a floppy disk, CD-ROM or DVD-ROM) or non-removable storage medium, this storage medium being partially or totally readable by a computer or a processor.

The various embodiments have been described above in relation to a management device 200 integrated into an item of terminal equipment STA, but it can also be independent of this item of terminal equipment and connected to it.

The invention claimed is:

1. A method for managing an item of security information, referred to as a first item of security information, to be used to establish a secure connection between at least one item of terminal equipment and an item of access equipment for accessing a communication network, said first item of security information being associated with a validity period, wherein said method is implemented by the item of access equipment and comprises:

upon expiry of the validity period, obtaining a second item of security information and triggering a deactivation time delay of the first item of security information;

in response to an item of terminal equipment of the at least one item of terminal equipment being connected to the item of access equipment, transmitting to said connected item of terminal equipment a re-authentication command message comprising at least the second item of security information and a re-authentication time delay, said re-authentication time delay expiring at the latest at the end of said deactivation time delay of the first item security information; and in response to a re-authentication request message being received from the connected item of terminal equipment before the expiry of the re-authentication time delay, re-authenticating the connected item of terminal equipment by using the second item of security information without the connection being switched off.

2. The method for managing an item of security information according to claim 1, wherein, following the triggering of the deactivation time delay, upon receipt of a message requesting establishment of a connection of at least one of the at least one item of terminal equipment comprising said first item of security information, the method comprises verifying at least one reconnection condition, said at least one condition comprising at least the non-expiry of a predetermined reconnection time delay, said reconnection time delay expiring at the earliest at the end of the deactivation time delay of the first item of security information, and if said at least one reconnection condition is met:

establishing the connection of the item of terminal equipment based on the first item of security information;

transmitting to said item of terminal equipment a re-authentication request message comprising at least the second item of security information and a re-authentication time delay; and switching off the connection upon expiry of the re-authentication time delay.

3. The method for managing an item of security information according to claim 2, wherein the reconnection time delay expires at the end of the deactivation time delay of the first item of security information.

4. The method for managing an item of security information according to claim 2, wherein the reconnection time delay expires at the end of a grace period triggered upon expiry of the deactivation time delay of the first item of security information.

5. The method for managing an item of security information according to claim 4, wherein, said item of terminal equipment having been previously registered to the network in association with a confidence item of information, said verifying at least one reconnection condition further verifies that the confidence item of information is set to a value "trustworthy".

6. The method for managing an item of security information according to claim 5, wherein the method comprises determining a list of terminal equipment of the at least one item of terminal equipment that is registered to the network with the confidence item of information set to the value "trustworthy" prior to the triggering of the deactivation time delay of the first item of security information and has not yet issued a connection request, and transmitting a notification message to the at least one item of terminal equipment before the grace period expires.

7. The method for managing an item of security information according to claim 6, wherein, upon expiry of the grace period, an additional grace period is triggered as long as the list is not empty.

8. A device for managing an item of security information, referred to as a first item of security information, to be used to establish a secure connection between at least one item of terminal equipment and an item of access equipment for accessing a communication network, said first item of security information being associated with a first validity period, wherein the device is distinct from the at least one item of terminal equipment and comprises:
   a processor; and
   a non-transitory computer-readable medium comprising instructions stored thereon which when executed by the processor configure the device to:
   upon expiry of the first validity period, obtain a second item of security information and trigger a deactivation time delay of the first item of security information;
   in response to an item of terminal equipment of the at least one item of terminal equipment being connected to the item of access equipment, transmit to said connected item of terminal equipment a re-authentication request message comprising at least the second item of security information and a re-authentication time delay, said re-authentication time delay expiring at the latest at the end of said deactivation time delay of the first item security information; and
   in response to a re-authentication request message being received from the connected item of terminal equipment before the expiry of the re-authentication time delay, re-authenticate the connected item of terminal equipment by using the second item of security information without the connection being switched off.

9. The device for managing an item of security information according to claim 8, wherein the device is implemented in the item of access equipment.

10. A method for managing a connection of an item of terminal equipment to a communication network, comprising an item of access equipment for accessing said network, said connection being secured by a first item of security information, said method being implemented by said item of terminal equipment and comprising:
   receiving from said item of access equipment via a connection to the communication network a re-authentication command message, comprising at least a second item of security information and a re-authentication time delay less than or equal to a deactivation time delay of the first item of security information; and
   transmitting, within the re-authentication time delay, a re-authentication request message to said item of access equipment comprising the second item of security information, and recording the second item of security information in place of the first item of security information.

11. The method for managing a connection of an item of terminal equipment according to claim 10, wherein the method comprises:
   when the item of terminal equipment is not connected to said network, receiving an item of information change notification message via an interface with another communication network, said message comprising a time delay for reconnecting to said network, said time delay expiring at the earliest at the end of the deactivation time delay of the first security information, and transmitting a request message for reconnecting to the communication network within said time delay.

12. The method for managing a connection of an item of terminal equipment according to claim 10, wherein the method further comprises determining an instant of transmission of said re-authentication request message to said item of access equipment within the re-authentication delay.

13. A device for managing a connection of an item of terminal equipment to a communication network, comprising an item of access equipment for accessing said network, said connection being secured by a first item of security information, wherein said device comprises:
   a processor; and
   a non-transitory computer-readable medium comprising instructions stored thereon which when executed by the processor configure the device to:
   receive a re-authentication command message from the item of access equipment via a connection to said network, said message comprising at least a second item of security information and a re-authentication time delay, said time delay expiring at the earliest at the end of the deactivation time delay of the first item of security information; and
   transmit within the re-authentication time delay a re-authentication request message to said item of access equipment comprising the second item of security information.

14. The device for managing a connection of the item of terminal equipment according to claim 13, wherein the device is implemented in the item of terminal equipment.

15. A non-transitory computer-readable medium comprising program code instructions stored thereon for implementing a method for managing a first item of security information, when the instructions are executed by a processor of an item of access equipment, wherein the first item of security information is used to establish a secure connection between an item of terminal equipment and the item of access equipment for accessing a communication network, said first item of security information being associated with a validity period, and wherein the instructions configure the item of access equipment to:
   upon expiry of the validity period, obtain a second item of security information and trigger a deactivation time delay of the first item of security information;
   in response to the item of terminal equipment being connected to the item of access equipment, transmitting to said connected item of terminal equipment a re-authentication command message comprising at least the second item of security information and a re-authentication time delay, said re-authentication time delay expiring at the latest at the end of said deactivation time delay of the first item security information; and
   in response to a re-authentication request message being received from the connected item of terminal equipment before the expiry of the re-authentication time delay, re-authenticating the connected item of terminal equipment by using the second item of security information without the connection being switched off.

16. A non-transitory computer-readable medium comprising program code instructions stored thereon for implementing a method for managing a connection of an item of terminal equipment to a communication network comprising an item of access equipment for accessing said network, when the instructions are executed by a processor of the item of terminal equipment, wherein said connection is secured by a first item of security information, and wherein the instructions configure the item of terminal equipment to:
- receive from said item of access equipment via a connection to the communication network a re-authentication command message, comprising at least a second item of security information and a re-authentication time delay less than or equal to a deactivation time delay of the first item of security information; and
- transmit, within the re-authentication time delay, a re-authentication request message to said item of access equipment comprising the second item of security information, and record the second item of security information in place of the first item of security information.

* * * * *